(12) United States Patent
Chaudry et al.

(10) Patent No.: US 8,532,055 B2
(45) Date of Patent: *Sep. 10, 2013

(54) APPARATUS, AND ASSOCIATED METHOD, FOR IMPROVEMENT IN FACILITATING ROUTING OF DATA BY A MOBILE NODE OPERABLE IN A PACKET RADIO COMMUNICATION SYSTEM

(75) Inventors: Shahid Chaudry, Ottawa (CA); Grace Yeung, Nepean (CA); Ian Michael Patterson, Petersburg (CA); David Anthony Bajar, Kitchener (CA); Darcy Richard Phipps, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1305 days.

This patent is subject to a terminal disclaimer.

(21) Appl. No.: 12/334,456

(22) Filed: Dec. 13, 2008

(65) Prior Publication Data

US 2009/0098877 A1 Apr. 16, 2009

Related U.S. Application Data

(63) Continuation of application No. 10/782,718, filed on Feb. 19, 2004, now Pat. No. 7,466,984.

(51) Int. Cl.
| | |
|---|---|
| *H04W 4/00* | (2009.01) |
| *H04W 36/00* | (2009.01) |
| *H04W 40/00* | (2009.01) |
| *H04L 12/28* | (2006.01) |
| *H04L 12/66* | (2006.01) |

(52) U.S. Cl.
USPC ........... 370/331; 370/328; 370/329; 370/330; 370/351; 370/352; 370/353; 370/354; 370/355; 370/356; 455/422.1; 455/432.1; 455/434; 455/436; 455/445

(58) Field of Classification Search
USPC ............... 370/328–331, 340, 341, 351–356; 455/422.1, 426.1, 426.2, 432.1–445, 515, 455/525, 68, 69
See application file for complete search history.

(56) References Cited

U.S. PATENT DOCUMENTS

| | | | |
|---|---|---|---|
| 5,734,980 A * | 3/1998 | Hooper et al. ................ 455/434 |
| 6,636,498 B1 | 10/2003 | Leung | |
| 6,799,038 B2 * | 9/2004 | Gopikanth ................ 455/435.2 |
| 7,164,912 B2 * | 1/2007 | Buckley et al. ............ 455/435.2 |
| 7,171,203 B2 | 1/2007 | Buckley | |
| 7,248,887 B2 | 7/2007 | Zhang et al. | |
| 7,292,592 B2 * | 11/2007 | Rune ............................ 370/401 |
| 7,466,984 B2 * | 12/2008 | Chaudry et al. .............. 455/445 |
| 2003/0063565 A1 | 4/2003 | Kakani et al. | |
| 2003/0119481 A1 * | 6/2003 | Haverinen et al. ............ 455/411 |
| 2004/0047345 A1 * | 3/2004 | Joseph et al. ................ 370/352 |
| 2005/0020270 A1 * | 1/2005 | Buckley ...................... 455/445 |
| 2005/0037791 A1 | 2/2005 | Zhang et al. | |
| 2006/0143300 A1 * | 6/2006 | See et al. ...................... 709/227 |
| 2006/0256728 A1 | 11/2006 | Li et al. | |

* cited by examiner

*Primary Examiner* — Luat Phung
*Assistant Examiner* — Kai Chang

(57) ABSTRACT

Apparatus, and an associated method, for facilitating routing of data in a packet radio communication system. A clone list is downloaded to the mobile node and stored at a clone list depository thereat. The clone list includes a plurality of entries, each of which provides routing information needed to route data when the mobile node is positioned within coverage areas encompassed by differing networks. A determination is made whether the clone list includes appropriate routing information to route a data packet sent by the mobile node positioned in a particular area encompassed by a particular network portion. If the clone list includes an entry containing such information, the need separately to request such information is obviated.

20 Claims, 4 Drawing Sheets

APPARATUS, AND ASSOCIATED METHOD, FOR IMPROVEMENT IN FACILITATING ROUTING OF DATA BY A MOBILE NODE OPERABLE IN A PACKET RADIO COMMUNICATION SYSTEM

CROSS-REFERENCE TO RELATED APPLICATION

This application is a continuation application of patent application Ser. No. 10/782,718 filed on Feb. 19, 2004, the contents of which are incorporated herein by reference.

The present invention relates generally to a manner by which to facilitate communication of data communicated by a mobile node operable in a packet radio communication system having multiple network portions. More particularly, the present invention relates to apparatus, and an associated method, by which to provide a clone list to a mobile node and to store the clone list thereat.

The clone list contains entries representing NPCs (Network Provider Codes) that identify same host routing information needed to route the data originated by the mobile node. A clone list is associated with a carrier, or network operator, of a network portion. The clone list contains multiple entries. Each entry lists routing information to be used by the mobile node when the mobile node is positioned within the coverage area of a network portion operated by the carrier or another with whom the carrier has an affiliation, such as a roaming agreement. The clone list contains multiple entries, reducing the possibility that the mobile node shall need to obtain additional routing information as the mobile node moves between coverage areas defined by different network portions or sub-portions of the communication system. Therefore, reduced amounts of over-the-air signaling are required by the mobile node to obtain the routing information needed to route data during its operation. When mobile enters the service area corresponding to new set of network portions that are not part of the current clone list with the mobile node then the mobile node needs to obtain a new clone list containing NPCs corresponding to new set of network portions and corresponding routing information.

BACKGROUND OF THE INVENTION

Recent years have been witness to a wide array of technological advancements that have purveyed many aspects of modern life. New types of communication systems, for instance, have been developed and deployed that provide for the effectuation of many different types of communication services. Ready access to communication systems are required by many through which to effectuate communication services, and many of the communication services have become, or are, practical necessities of modern society.

Technological advancement shall likely continue, and, when such technological advancements are deployed in communication systems, new communication services shall likely become available. Generally, when deployed, technological advancements permit communication services to be effectuated more efficiently at increased data communication rates, or in manners to provide better for successful recovery of the informational content of the data that is communicated even when the data is communicated in adverse communication conditions.

Digital communication techniques are amongst the technological advancements that have been implemented in communication systems. The use of digital communication techniques provides various communication advantages. For instance, through the use of digital communication techniques, data redundancies can be removed prior to the communication of the data. And, as a result, the improved communication efficiencies permit data throughput rates, i.e., the rates at which the data can be communicated, to be increased relative to a corresponding communication system that fails to make use of digital communication techniques.

A radio communication system is a communication system that utilizes radio channels by which to communicate the data between communication stations that are parties to a communication session by which a communication service is effectuated. The radio channels are defined upon a portion of the electromagnetic spectrum, and the radio channels are defined, at least in part, by the frequencies upon which the data is communicated. The communication stations that are operable pursuant to a communication session to communicate data therebetween operate variously to convert data that is to be communicated into a form capable of communication on the communication channel and to detect the data communicated thereon. Once detected, the informational content of the data is recovered.

Use of radio communication systems is sometimes preferred over use of wireline communication systems due to various advantages inherent to, or permitted by, communication of data by way of radio channels. Because a wireline connection is not required to interconnect the communication stations between which data is communicated in a radio communication system, use of a radio communication system permits communications to be effectuated even when wireline connections cannot easily be formed. Additionally, as the need for a wireline connection between the communication stations is obviated, a radio communication system is amenable for implementation as a mobile communication system in which one or more communication stations that are parties to a communication session are provided communication mobility.

A cellular communication system is a type of radio communication system. A cellular communication system is typically implemented as a two-way communication system that provides for full duplex communications. The networks of cellular communication systems have been deployed over significant portions of the populated areas of the world. And, usage levels of cellular communication systems are large and growing, sometimes approaching the levels of the levels of usage of conventional telephonic systems. And, while cellular communication systems were first used, and continue to be used to effectuate voice communication services, the new generations of cellular communication systems increasingly provide for the effectuation of high speed data services. Additionally, data messaging services are amongst the communication services that increasingly are effectuated by way of a cellular communication system.

Data messages are communicated, for instance, between the network part of the communication system and a mobile node positioned within an area encompassed by the communication system. Data messages that are to be terminated at the mobile node are sent by the network part of the communication system by way of down-link, or forward-link, channel to the mobile node. And, data messages originated at the mobile node are sent upon up-link, or reverse-link, channels to the network part.

Data messages are, in digital cellular communication systems, typically formatted into data packets. The data message is communicated by sending one or more data packets that contain the informational content of the data message by way of an appropriate channel formed between the mobile node and the network part. A data packet is typically formatted to include a header part and a payload part. The payload part includes the informational content of the message, and the header part includes, amongst other things, routing information. The routing information is used to route the data packet to its intended destination.

The routing information needed by which to route the data packet to its intended destination is dependent upon the location of the mobile node when the data packet is sent therefrom. And, because the mobile node is inherently mobile, the routing information required to route the data packets to its intended destination might differ at different times, depending upon the location of the mobile node and through which portions of the network part that the data packet shall be routed to be delivered to its intended destination.

The mobile node is associated with a home network. When the mobile node is positioned in an area encompassed by its home network, the data packet is communicated, by way of a radio channel, to the home network of the mobile node and then routed through the network for delivery to its destination. However, when the mobile node roams beyond its home network, i.e., the mobile node roams into an area encompassed by another network and not the home network, different routing information is required to route the data packet to its intended destination. The routing of the data packet sometimes utilizes tunneling in which a so-called tunnel is formed by way of which the data packet is routed to its intended destination. Otherwise, the data packet is delivered to its destination without tunneling.

In order for the mobile node to be permitted to communicate by way of a non-home network, arrangements must be made by the operators, i.e., the carriers, of the respective networks to permit the mobile node access to the non-home network to communicate the data packet therethrough. And, if an area is encompassed by more than one cellular communication system, an arrangement is sometimes made with one, and not another, of the operators of the respective non-home networks. When a data message formed of the one or more data packets is to be communicated when the mobile node is positioned in such area, the message is communicated by way of the non-home network whose operator maintains the roaming agreement, or other affiliation, with the operator of the home network of the mobile node.

Some conventional mobile nodes include a host-routing table at which the routing information needed to populate the header portion of the data packet formed at the mobile node is stored. In a conventional mobile node, the host routing table is sometimes only a single entry. That is to say, the host routing table contains host routing information that permits routing of the data packet when the mobile node is positioned in a single area. When the mobile node moves, subsequently to be positioned in another area, new routing information must be obtained and downloaded to the mobile node. The additional information is obtained through the generation of a registration request. However, each time in which a registration request is sent by the mobile node, additional radio air resources are used. As the use of the radio air resources to send, and to respond to, the registration request forms overhead signaling, the need conventionally to send the multiple registration requests increases system overhead and reduces the communication capacity of the communication system.

A manner by which to provide the mobile node with routing information that requires lessened amounts of overhead would therefore permit communication capacity of the communication system to be increased.

It is in light of this background information related to communication of data in a packet radio communication system that the significant improvements of the present invention have evolved.

SUMMARY OF THE INVENTION

The present invention, accordingly, advantageously provides apparatus, and an associated method, by which to facilitate communication of data communicated by a mobile node operable in a packet radio communication system having multiple network portions.

Through operation of an embodiment of the present invention, a manner is provided by which to provide a clone list to a mobile node and to store the clone list thereat. The clone list, containing multiple NPC entries, is utilized to obtain different network portions that correspond to the same routing information needed to route data packets that are subsequently communicated by the mobile node.

The clone list is formed of a plurality of entries, each of which represents an NPC and identifies host routing information needed to route data originated by the mobile node. The clone list that is provided to the mobile node is associated with a carrier, or a network operator, of a network portion of the multiple network-portion network part of the packet radio communication system.

The clone list, associated with the carrier, contains multiple entries. Each entry on the list represents same routing information that, when accessed, is used to populate the header portion of a data packet formatted at the mobile node for communication to a destination. The clone list includes entries, identifying the host routing information, to be used by the mobile node when the mobile node is positioned at various areas, encompassed by various network portions of the packet radio communication system. The listing contained on a clone list identifies, for instance, routing information that is to be used by the mobile node when the mobile node is positioned within the coverage area of a network portion operated by a particular carrier or the network portion operated by an entity that has an affiliation with the carrier. The affiliation is, for instance, a data roaming agreement between the operators of the respective network portions.

The clone list contains multiple entries, reducing the possibility that the mobile node shall need to obtain additional routing information when moving across the network portions identified by the multiple NPC entries. Therefore, only a reduced amount of over-the-air signaling is required by the mobile node to obtain routing information.

In one aspect of the present invention, a depository formed of a memory element is maintained at the mobile node. The depository is used pursuant to operation of an embodiment of the present invention by which to store a clone list provided to the mobile node. The clone list contains entries that define host routing information needed to route data sent by the mobile node during its operation. The clone list that is provided to the mobile node is dependent, at least in part, upon in which area that the mobile node is positioned when the clone list is to be provided thereto. Once provided to the mobile node and stored at the depository formed thereat, the entries of the clone list representing different NPCs are accessed to determine that the same routing information be used to populate the header portion of data packets formed at the mobile node, thereby to permit the data packets so-formed to be routed to their intended destination.

An accessor operates to access the clone list and, to retrieve the routing information therefrom. In the exemplary implementation, the clone list is indexed in terms of network provider codes (NPCs). The network provider code is formed of values, depending in part upon the type of network that the network provider code identifies. When the network operates, for instance, pursuant to a GSM/GPRS (Global System for Mobile communications/General Packet Radio Service), the network provider code is formed of values of a mobile country code (MCC), a mobile network code (MNC), and a GPRS suffix value. Conversely, when the network is operable pursuant to a CDMA (Code Division Multiple Access) operating standard, the network provider code utilizes values of a system identifier (SID) in substitution for the mobile country code and mobile network code. A single network sometimes utilizes multiple SID values, hence different network provider codes, at different areas encompassed by the network. A single carrier, i.e., operator therefore potentially has a significant number of different network provider codes that identify the networks in different manners, to be used also to route data communicated by the mobile node to its destination. The network provider code that is to be used by the mobile node to populate the header portion of a data packet is dependent upon the location of the mobile node when the data is to be communicated. The clone list includes each of the network provider codes associated with the carrier.

Additionally, the carrier, i.e., operator of a network typically maintains affiliations with operators of other networks. The affiliations provide the capability of a mobile node, associated with a particular carrier, to be operated when the mobile node is positioned at an area encompassed by another network, other than that of the carrier with whom the mobile node is associated. The affiliations include data roaming agreements, as well as other types of agreements, that permit operation of the mobile node. When the mobile node is positioned within such other areas, routing information is also required properly to route data packets when the data is to be communicated by the mobile node when the mobile node is positioned within such other areas. The clone list further includes entries identifying the routing information, such as by network provider codes, for the networks with whom the carrier maintains the affiliations such that same routing information can be used by the mobile while in the roaming partner's network.

Instead of a single NPC entry maintained at the mobile node, the clone list includes a plurality of entries, accessible as needed, to provide the same routing information to route the data to its intended destination. The need of the mobile node to request additional routing information each time in which the mobile node roams into a new coverage area to obtain new routing information is significantly reduced as the clone list includes a plurality of entries. New routing information is required to be requested only when the mobile node enters into an area for which NPC is not contained at the clone list. When the routing information requests for new NPC are made as part of a registration request, the number of registration requests are, accordingly, significantly reduced. Improved system performance is permitted as overhead signaling is reduced.

In these and other aspects, therefore, apparatus, and an associated method, is provided for a packet radio communication system. The packet radio communication system has a network part that is formed of a first network portion and at least a second network portion. A mobile node is selectably operable to communicate data by way of the first network portion when the mobile node is positioned within a first coverage area associated with the first network portion. And, the mobile node is selectably operable to communicate data by way of the at least the second network portion when the mobile node is positioned within at least a second coverage area associated with the at least the second network portion. Routing of the data originated by the mobile node is facilitated when the mobile node is positioned in any of the first and at least second coverage areas for delivery to a data destination. A clone list depository is embodied at the mobile node. The clone list depository stores a clone list that is provided to the mobile node. The clone list that is stored at the mobile node lists multiple NPC corresponding to same routing information by which to route data originated by the mobile node when positioned at least at any location within a selected one of the first and at least second coverage areas. The clone list that is provided to the mobile node is dependent, in part, upon in which of the first and at least second coverage areas that the mobile node is positioned. An accessor accesses entries of the clone list and the corresponding routing information. The entries accessed by the accessor are used to determine where to route the data originated by the mobile node.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
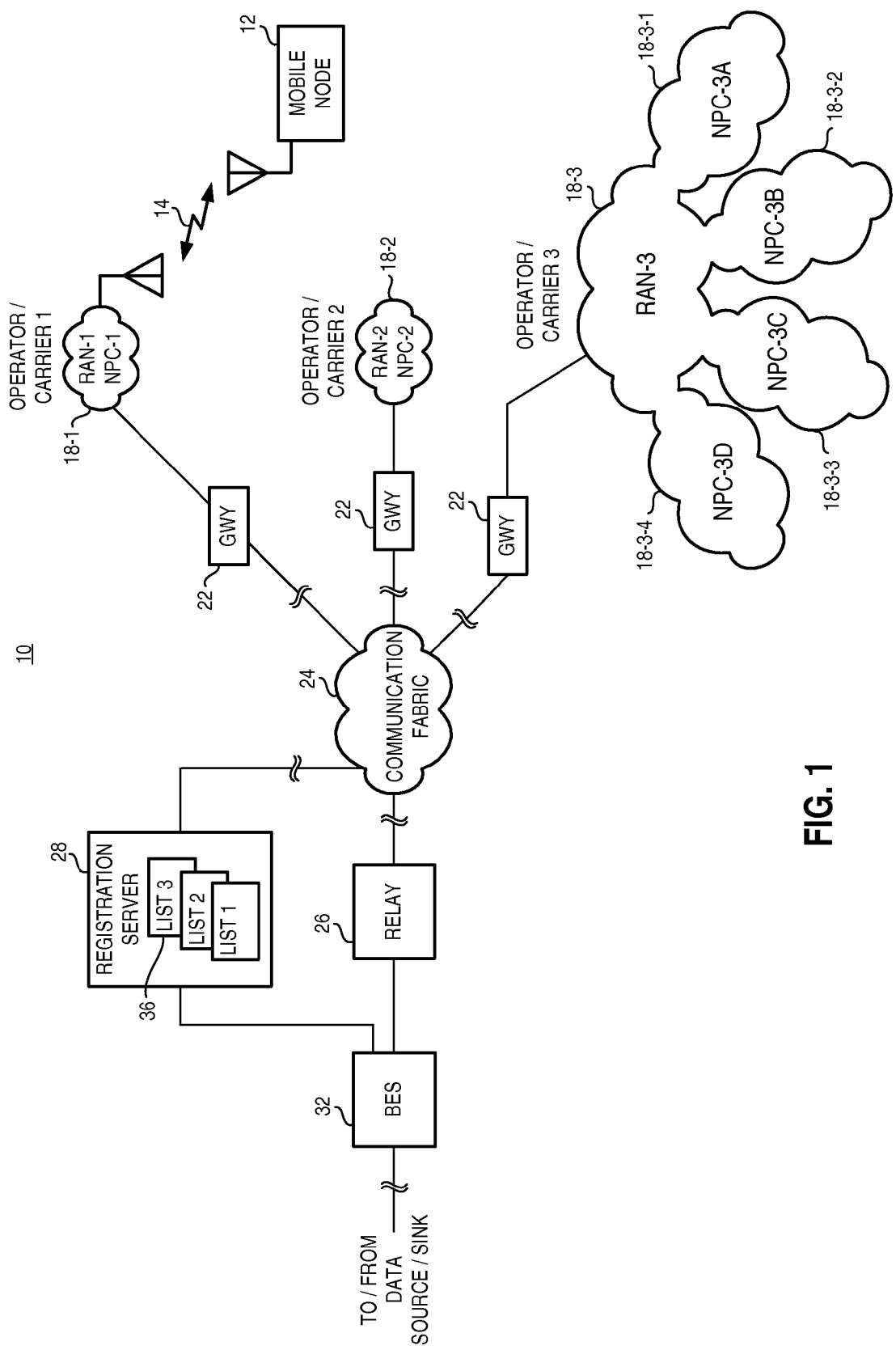
FIG. 1 illustrates a functional block diagram of a packet radio communication system in which an embodiment of the present invention is employed to facilitate routing of packet data communicated during operation of the communication system.

Referring first to FIG. 1, a packet radio communication system, shown generally at 10, provides for the effectuation of packet communication services. The communication system includes a network part and mobile nodes, of which the mobile node 12 is representative. The data, here referred to as data messages, communicated by, and with, the mobile node, are communicated upon radio channels here represented by the arrow 14, defined upon a radio air interface extending between the network and the mobile node. Data communicated to the mobile node is communicated upon forward-link, or down-link, channels for delivery to the mobile node. And, data originated at the mobile node is communicated upon up-link, or reverse-link, channels for delivery to the network part of the communication system.

The mobile node, as its name indicates, is positionable at different locations and capable of sending data messages when positioned at any of various different locations. The position at which the mobile node is located when a data message is sent is determinative, at least in significant part, to the location at which the mobile node is positioned when the message is sent. Different portions of the network, sometimes operated by different network operators, i.e., carriers, are deployed over differing geographical areas. Network portions, operated by different network operators are sometimes also deployed to encompass overlapping geographical areas. When the same geographical area is encompassed by more than one of the networks is preferred over the other, or others, through which to communicate by, and with, a particular mobile node. A single network portion is sometimes also further sub-divided into sub-portions. When the mobile node is positioned within an area encompassed by a sub-portion of a network, the mobile node communicates generally with the appropriate sub-portion of the network.

In the exemplary representation of the figure, the network of the communication system includes three separate radio access networks 18 forming three separate portions of the network part of the communication system. A first radio access network (RAN-1) 18-1, a second radio access network (RAN-2) 18-2, and a third radio access network (RAN-3) 18-3 are representative of separate network portions of the network of the communication system. For purposes of example, each of the network portions 18 is operated by a separate network operator or carrier. The third radio access network 18-3 includes sub-portions, 18-3-1, 18-3-2, 18-3-3, and 18-3-4.

The separate network portions are identified by separate network provider codes (NPC). And, more particularly, the first radio access network has a first network provider code (NPC1) associated therewith. The second radio access network has a second network provider code (NPC2) associated therewith. And, the third radio access network is identified by four separate network provider codes, one associated with each of the sub-portions 18-3-1 through 18-3-4. The network provider codes associated with the respective sub-portions are here represented as NPC-3-1, NPC-3-2, NPC-3-3, and NPC-3-4.

Each of the network provider codes is formed of values that identify the associated network portion and is used as routing information when data packets are routed to effectuate a communication service. When, for instance, the network is operable pursuant to a GSM/GPRS (Global System for Mobile communications/General Packet Radio Service) operating specification, the NPC is formed of an MCC (mobile country code), an MNC (mobile network code), and a GPRS suffix value. When the network is operable pursuant to a CDMA standard a SID (system identifier) is used rather than MCC and MNC in the formation of the NPC.

Each of the network portions is coupled, by way of a gateway 22, to a communication conduit, here identified as a communication fabric 24, to other entities. Amongst the other entities that are coupled to the communication fabric are a relay 26 and registration server 28. The registration server and relay are further coupled to a server, here identified as a Blackberry™ Enterprise server (BES) 32.

During exemplary operation of the communication system, the mobile node registers with the registration server 28 by sending a registration request thereto. Here, a single registration server, i.e., the server 28, handles registrations of mobile nodes, such as the mobile node 12, for the relay 26. The registration server provides routing information to the mobile node, usable by the mobile node to cause data packets subsequently sent by the mobile node in manners permitting delivery of the messages to a desired destination, here the relay 26. Because the mobile node is positionable to be in communication connectivity with different network portions, such as any one of the network portions 18-1 through 18-3 or sub-portions thereof, the routing information is dependent upon through which of the network portions that the mobile node shall be communicating. Conventionally, a single routing information entry corresponding to a single NPC is provided to the mobile node. And, each time in which the mobile node moves into a new NPC area such that the routing information differs, new routing information must be requested by the mobile node and the new routing information must be provided thereto.

Pursuant to an embodiment of the present invention, the registration server 28 includes lists 36 that contain multiple entries. Copies of the lists, referred to as clone lists, are provided to the mobile node to provide the mobile node with information, usable by the mobile node to obtain routing information. Because the multiple entries are contained in a list that is provided to the mobile node, the frequency with which the mobile node must request new routing information is reduced.

Figure 2:
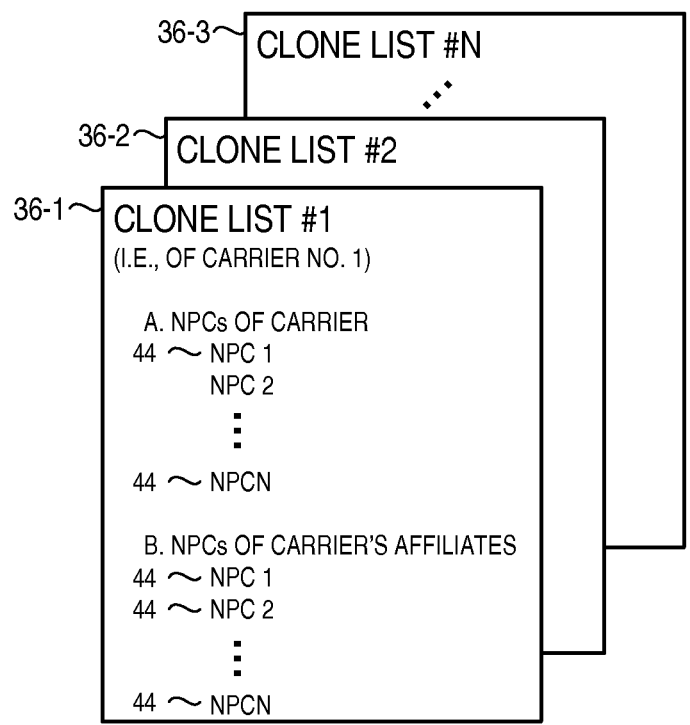
FIG. 2 illustrates a representation of exemplary clone lists formed and utilized pursuant to operation of the communication system shown in FIG. 1.

FIG. 2 illustrates representations of the clone lists 36. A separate clone list is associated with each of the separate carriers or network operators. Here, a separate network operator is associated with each of the three radio access networks 18-1, 18-2, and 18-3. The top-most (as shown) list 36-1 is shown to include a plurality of entries 44. Each of the entries 44 identifies a network provider code, represented as NPC1, NPC2, etc. A first group of the entries 44 are network provider codes of the carrier associated with the list. And, a second group of the entries are of the network provider codes of networks that are affiliates of the network associated with the list 36-1.

When a registration request is sent by the mobile node and routed to the registration server, an appropriate list 36 is accessed at the registration server and the list is provided to the mobile node to be stored thereat. Appropriate entries are accessed at the list, once stored at the mobile node. If the mobile node moves into a new area, as long as routing information is contained in the clone list to permit routing of data to the relay 26, the mobile node need not again request the registration server to download additional routing information.

Figure 3:
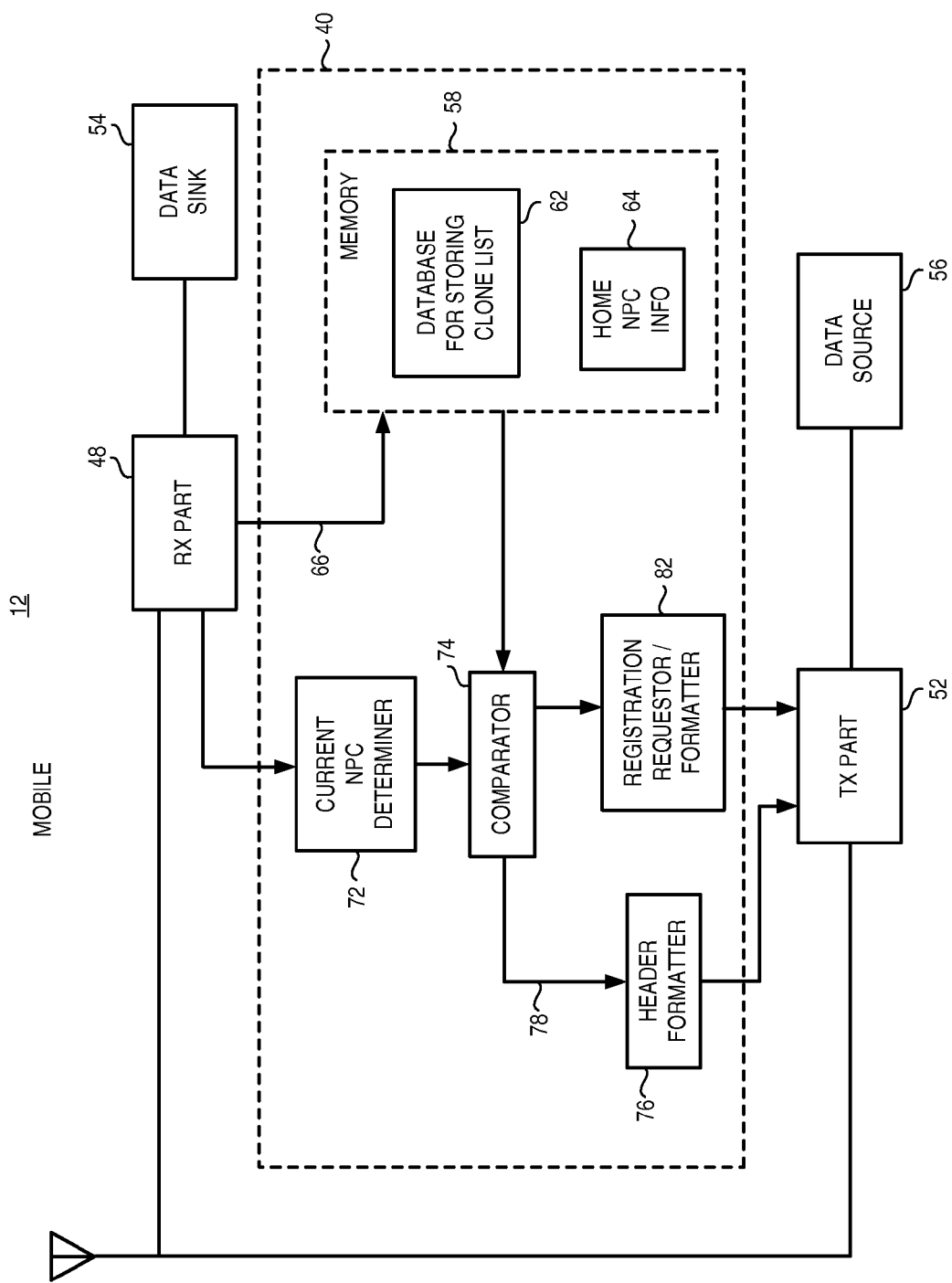
FIG. 3 illustrates a functional block diagram of a mobile node that includes apparatus of an embodiment of the present invention and that forms a portion of the packet radio communication system shown in FIG. 1.

FIG. 3 again illustrates the mobile node 12. The mobile node again is shown to include the apparatus 40 of an embodiment of the present invention as a portion thereof. The mobile node includes transceiver circuitry, here shown to include a receive part 48 and a transmit part 52. Data received at the mobile node is operated upon by the receive part and indications of the detected data is provided to a data sink 54. And, data sourced at a data source 56 is provided to the transmit part 52 to be converted into a form to permit its communication on a radio channel.

The apparatus 40 embodied at the mobile node is here shown to be formed of functional entities, implementable in any desired manner, such as by algorithms executable by processing circuitry. The apparatus also includes a memory device 58, here including a clone list depository 62 and a home network storage element 64 that contains home NPC information. A clone list is downloaded to the mobile node responsive to a registration request and stored at the clone list depository 62. Entries contained in the clone list stored at the depository are selectably accessed for subsequent use to provide routing information to route data subsequently communicated by the mobile node. The line 66 extending between the receive part and the memory element 58 is representative of the downloaded clone list to the clone list depository 62. And, the network provider code stored at the storage element 64 is stored thereat during initial provisioning of the mobile node, at least semi-permanently to store the value of the network provider code of the home network associated with the mobile node thereat.

A determination is made, here indicated by the current NPC determiner 72, of the network provider code of the current network in whose coverage area that the mobile node is positioned. An indication of determinations made by the determiner are provided to a comparator 74. The comparator compares the value determined by the determiner with values stored at the clone list depository 62. If a value of a network provider code stored at the clone list corresponds to the value determined by the determiner, routing information needed to route data subsequently to be communicated by the mobile node is obtained from the clone list.

The apparatus also includes a header formatter 76 to which routing information is provided, here indicated by way of the line 78, in the event that comparisons made by the comparator indicate that the appropriate routing information is contained at the clone list. The header formatter operates to format a data packet forming a data message to include, in the header portion thereof, the necessary routing information. Formatted data packets are communicated by the transmit part 52. And, the apparatus also includes a registration requester 82 coupled to receive indications when the comparator determines that the clone list stored at the clone list depository fails to include the routing information needed properly to route a data packet to the relay. A registration request is formed, or caused to be formed, by the registration requester and a registration request is communicated by the mobile node to request, from the registration server, another clone list that contains the needed routing information.

Figure 4:
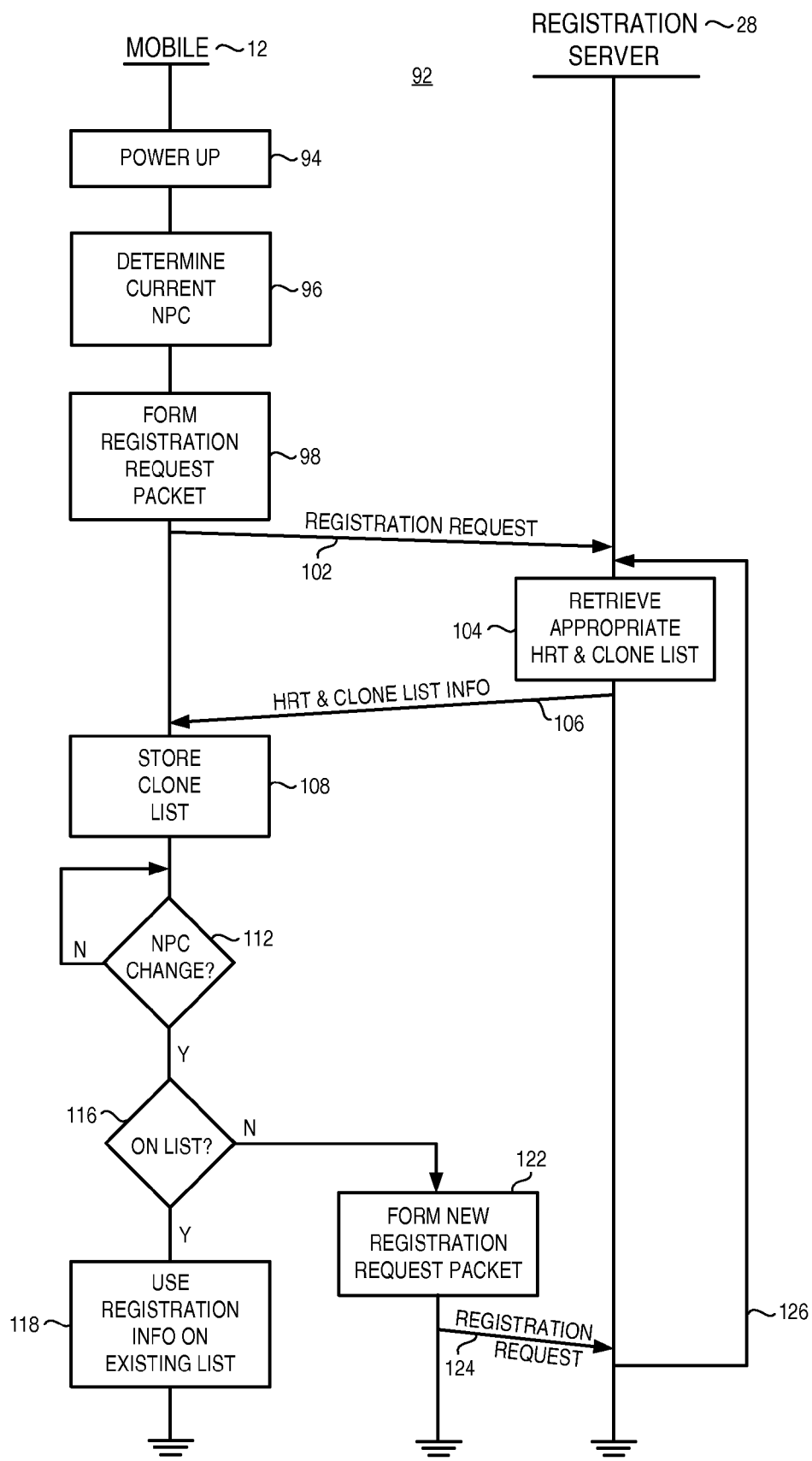
FIG. 4 illustrates a partial message sequence, a partial functional block diagram representative of operation of an embodiment of the present invention employed in the communication system shown in FIG. 1.

FIG. 4 illustrates a diagram, shown generally at 92, representative of operation of the apparatus embodied at the mobile node 12 and signaling between the mobile node 12 and the registration server 28 pursuant to operation of an embodiment of the present invention.

First, and as indicated by the block 94, the mobile node is powered up. A determination is made, indicated by the block 96, of the current network provider code of the network in whose coverage area that the mobile node is positioned. Determination is made, for instance, by analyzing data broadcast by the network. Then, and as indicated by the block 98, a registration request packet is formed.

The registration request packet is sent, indicated by the segment 102, to the registration server to request downloading to the mobile node of an appropriate home routing table and clone list. When the request is received at the registration server, the registration server retrieves the appropriate information, indicated by the block 104. And, the information is downloaded, indicated by the segment 106, to the mobile node.

The clone list, once delivered to the mobile node, is stored, indicated by the block 108, at the clone list depository of the mobile node. Thereafter, a determination is made, indicated by the decision block 112, as to whether the mobile node is moved to be positioned in a coverage area of a different network, indicated by its network provider code. If not, the no branch is taken back, and the determinations are again made. Otherwise, the yes branch is taken to the decision block 116. A determination is made at the decision block 116 as to whether the network provider code of the network in whose coverage area that the mobile node has entered is on the clone list. If so, the yes branch is taken to the block 118, and the registration information contained on the clone list is used to provide routing information to route data packets subsequently sent by the mobile node. Otherwise, the no branch is taken to the block 122. A new registration request packet is formed and the registration request is sent, indicated by the block 124. A branch, indicated by the block 126, is taken back to the block 104 and operations continue.

Through operation of an embodiment of the present invention, therefore, more than a single host routing information entry is maintained at the mobile node as part of a clone list. As the clone list includes a plurality of entries, the likelihood that the mobile node shall be able to properly route a data packet with routing information contained on the clone list without the need to generate an additional registration request is increased. Reduced overhead signaling between the mobile node and the network is possible, improving the system capacity of the communication system.

The previous descriptions are of preferred examples for implementing the invention, and the scope of the invention should not necessarily be limited by this description. The scope of the present invention is defined by the following claims.

What is claimed is:

1. An apparatus for facilitating routing of data originated at a mobile node when positioned at any of a first network coverage area and at least a second network coverage area, said apparatus comprising:

a clone list depository embodied at the mobile node, said clone list depository configured to store a clone list that is provided to the mobile node and that contains routing information useable by the mobile node to populate header portions of data packets forming the data originated at the mobile node and which is determinative of destination-routing of the data packets when the mobile node is positioned at any of the first coverage area and the second coverage area;

an accessor embodied at the mobile node to access entries of the clone list stored at said clone list depository; and a header formatter embodied at the mobile node to format data packets to include routing information contained at the clone list at said clone list depository and accessed by said assessor.

2. The apparatus of claim 1 further comprising a requestor embodied at the mobile node to generate a request responsive to which the clone list is provided to the mobile node.

3. The apparatus of claim 2 wherein said request comprises a registration requestor.

4. The apparatus of claim 2 wherein the request generated by said requestor includes an identifier that identifies positioning of the mobile node.

5. The apparatus of claim 4 wherein the clone list that is provided to the mobile node is further responsive to the identifier that identifies the positioning of the mobile node.

6. The apparatus of claim 2 wherein the request generated by said requestor includes an identifier that identifies a home network of the mobile node.

7. The apparatus of claim 6 wherein the clone list that is provided to the mobile node is further responsive to the identifier that identifies the positioning of the mobile node.

8. The apparatus of claim 1 wherein the clone list comprises multiple entries.

9. The apparatus of claim 8 wherein each entry of the multiple entries of the clone list comprises a network provider code.

10. The apparatus of claim 9 wherein the network provider code comprises a mobile country code and a mobile network code.

11. The apparatus of claim 1 wherein the clone list comprises a first clone list associated with a first carrier and a second clone list associated with a second carrier.

12. A method for facilitating routing of data originated at a mobile node when positioned at any of a first network coverage area and at least a second network coverage area, said method comprising:

storing a clone list that is provide to the mobile node and that contains routing information useable by the mobile node to populate header portions of data packets forming the data originated at the mobile node and which is determinative of destination-routing of the data packets;

accessing entries of the clone list; and formatting data packets to include routing information stored at the clone list during said storing and accessed during said accessing.

13. The method of claim 12 further comprising generating a request that request providing of the clone list to the mobile node.

14. The method of claim 13 wherein said generating comprises generating a registration request.

15. The method of claim 13 wherein the request generated during said generating further comprises an identifier that identifies positioning of the mobile node.

16. The method of claim 13 wherein the request generated during said generating further comprises an identifier that identifies a home network of the mobile node.

17. The method of claim 12 wherein said storing comprises storing a clone list containing multiple entries, each entry containing a network provider node.

18. A method for facilitating routing of mobile-node-originated data sendable by way of any of a first network portion and a second network portion of a network, depending upon mobile-node positioning, said method comprising:

receiving at a network server a request for a clone list that contains routing information useable to populate header portions of data packets forming mobile-node-generated data and which is determinative of destination-routing of the data packets sent by way of any of the first network portion and the second network portion;

retrieving the clone list; and downloading the clone list responsive to the request, once retrieved during said retrieving.

19. The method of claim 18 wherein said receiving comprises receiving a registration request.

20. An apparatus for a network server for facilitating routing of mobile-node-originated data sendable by way of any of a first network portion and a second network portion of a network, depending upon mobile-node positioning, said apparatus comprising:

a receiver embodied at a network server to receive a request for a clone list that contains routing information useable to populate header portions of data packets forming the mobile-node-originated data and which is determinative of destination-routing of the data packets sent by way of any of the first network portion and the second network portion;

a retriever embodied at the network to retrieve the clone list; and a downloader embodied at the network server to download the clone list responsive to the request, once retrieved by said retriever.

* * * * *